United States Patent
Smith et al.

(10) Patent No.: US 11,135,832 B2
(45) Date of Patent: *Oct. 5, 2021

(54) LOW-VOLUME FLEXOGRAPHIC INKING SYSTEM

(71) Applicant: Eastman Kodak Company, Rochester, NY (US)

(72) Inventors: Gary A. Smith, Rochester, NY (US); Michael G. Shaughnessy, Hemlock, NY (US); Timothy John Young, Williamson, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 322 days.

This patent is subject to a terminal disclaimer.

(21) Appl. No.: 16/218,616

(22) Filed: Dec. 13, 2018

(65) Prior Publication Data

US 2020/0189262 A1 Jun. 18, 2020

(51) Int. Cl.
| | |
|---|---|
| *B41F 31/02* | (2006.01) |
| *B41F 31/06* | (2006.01) |
| *B41F 31/26* | (2006.01) |
| *G06F 3/044* | (2006.01) |

(52) U.S. Cl.
CPC ............ *B41F 31/027* (2013.01); *B41F 31/06* (2013.01); *B41F 31/26* (2013.01); *B41P 2200/12* (2013.01); *G06F 3/044* (2013.01); *G06F 2203/04103* (2013.01)

(58) Field of Classification Search
CPC ........ B41F 31/027; B41F 31/06; B41F 31/26; B41F 31/07; B41F 13/11; B41P 2200/12; G06F 3/044; G06F 2203/04103
See application file for complete search history.

(56) References Cited

U.S. PATENT DOCUMENTS

| | | | | |
|---|---|---|---|---|
| 4,361,089 | A * | 11/1982 | Wittkopf | B41F 5/24 101/182 |
| 5,722,324 | A * | 3/1998 | Nishiwaki | B41F 31/10 101/363 |
| 5,983,797 | A * | 11/1999 | Secor | B41F 31/027 101/169 |
| 6,116,158 | A * | 9/2000 | DeMoore | B41F 23/08 101/177 |
| 6,312,367 | B1 | 11/2001 | Rogge | |
| 6,526,883 | B2 * | 3/2003 | Steffens | B41F 31/18 101/350.1 |
| 9,327,494 | B1 | 5/2016 | Smith et al. | |
| 9,504,164 | B2 | 11/2016 | Ramakrishnan et al. | |

(Continued)

*Primary Examiner* — David H Banh
(74) *Attorney, Agent, or Firm* — Kevin E. Spaukling; David A. Novais

(57) ABSTRACT

An inking system for use in transferring ink to a flexographic printing plate in a flexographic printing system includes an anilox member having an ink transfer zone located between first and second recessed bearing contact zones. A radius of the recessed bearing contact zones is less than a radius of the ink transfer zone by at least 0.100 inches. An ink tray includes a floor and first and second end walls. Bearings are mounted outside of the end walls which engage with the first and second bearing contact zones, respectively, thereby positioning the ink tray assembly in a specified position relative to the anilox member. Upper edges of the end walls extend into the recessed bearing contact zones.

18 Claims, 17 Drawing Sheets

(56) References Cited

U.S. PATENT DOCUMENTS

| | | | |
|---|---|---|---|
| 9,522,524 B2 | 12/2016 | VanOstrand | |
| 9,669,617 B2 | 6/2017 | VanOstrand | |
| 2010/0258015 A1* | 10/2010 | Boettcher | B41F 9/1081 |
| | | | 101/157 |
| 2012/0304878 A1* | 12/2012 | Zhang | G03G 15/11 |
| | | | 101/177 |
| 2014/0295063 A1 | 10/2014 | Petcavich et al. | |
| 2014/0349013 A1 | 11/2014 | Petcavich et al. | |
| 2015/0101745 A1 | 4/2015 | Ramakrishnan et al. | |
| 2016/0168713 A1 | 6/2016 | Reuter et al. | |

\* cited by examiner

LOW-VOLUME FLEXOGRAPHIC INKING SYSTEM

CROSS-REFERENCE TO RELATED APPLICATIONS

Reference is made to commonly assigned, co-pending U.S. patent application Ser. No. 16/032,376, entitled: "Anilox roller with non-contact end zones," by G. Smith; to commonly assigned, co-pending U.S. patent application Ser. No. 16/032,430, entitled: "Fabricating anilox rollers with non-contact end zones," by G. Smith; and to commonly assigned, co-pending U.S. patent application Ser. No. 16/218,638 (now US Publication No. 2020/0189263), entitled: "Low-volume gravure inking system," by G. Smith et al.; each of which is incorporated herein by reference.

FIELD OF THE INVENTION

This invention pertains to the field of flexographic printing, and more particularly to inking systems for flexographic printing systems.

BACKGROUND OF THE INVENTION

Processing a web of media in roll-to-roll fashion can be an advantageous and low-cost manufacturing approach for devices or other objects formed on the web of media. An example of a process that includes web transport through an additive printing system is roll-to-roll flexographic printing.

Co-planar wave guide circuits and touch screens are two examples of electrical devices that can be manufactured using a roll-to-roll additive flexographic printing process. For example, a capacitive touch screen includes a substantially transparent substrate which is provided with electrically conductive patterns that do not excessively impair the transparency—either because the conductors are made of a material, such as indium tin oxide, that is substantially transparent, or because the conductors are sufficiently narrow such that the transparency is provided by the comparatively large open areas not containing conductors. For capacitive touch screens having metallic conductors, it is advantageous for the features to be highly conductive but also very narrow. Capacitive touch screen sensor films are an example of an article having very fine features with improved electrical conductivity resulting from an additive printing system.

U.S. Patent Application Publication 2014/0295063 by Petcavich et al., which is incorporated herein by reference, discloses a method of manufacturing a capacitive touch sensor using a roll-to-roll process to print a conductor pattern on a flexible transparent dielectric substrate. A first conductor pattern is printed on a first side of the dielectric substrate using a first flexographic printing plate and is then cured. A second conductor pattern is printed on a second side of the dielectric substrate using a second flexographic printing plate and is then cured. The ink used to print the patterns includes a catalyst that acts as seed layer during a subsequent electroless plating process. The electrolessly-plated material (e.g., copper) provides the low resistivity in the narrow lines of the grid needed for excellent performance of the capacitive touch sensor. Petcavich et al. indicates that the line width of the flexographically-printed microwires can be 1 to 50 microns.

Flexography is a method of printing or pattern formation that is commonly used for high-volume printing runs. It is typically employed in a roll-to-roll format for printing on a variety of soft or easily deformed materials including, but not limited to, paper, paperboard stock, corrugated board, polymeric films, fabrics, metal foils, glass, glass-coated materials, flexible glass materials and laminates of multiple materials. Coarse surfaces and stretchable polymeric films are also economically printed using flexography.

Flexographic printing members are sometimes known as relief printing members, relief-containing printing plates, printing sleeves, or printing cylinders, and are provided with raised relief images (i.e., patterns of raised features) onto which ink is applied for application to a substrate. While the raised relief images are inked, the recessed relief "floor" should remain free of ink.

Although flexographic printing has conventionally been used in the past for the printing of images, more recent uses of flexographic printing have included functional printing of devices, such as touch screen sensor films, antennas, and other devices to be used in electronics or other industries. Such devices typically include electrically conductive patterns.

To improve the optical quality and reliability of the touch screen, it has been found to be preferable that the width of the grid lines be approximately 2 to 10 microns, and even more preferably to be 4 to 8 microns. In addition, in order to be compatible with high-volume roll-to-roll manufacturing processes, it is preferable for the roll of flexographically printed material to be electrolessly plated in a roll-to-roll electroless plating system. More conventionally, electroless plating is performed by immersing the item to be plated in a tank of plating solution. However, for high volume uniform plating of features on both sides of the web of substrate material, it is preferable to perform the electroless plating in a roll-to-roll electroless plating system.

Flexography is a form of rotary web letterpress, combining features of both letterpress and rotogravure printing, which uses relief plates comprised of flexible rubber or photopolymer plates and fast drying, low viscosity solvent, water-based or UV curable inks fed from an anilox roller. Traditionally, patterns for flexographic printing plates (also known as flexo-masters) are created by bitmap patterns, where one pixel in bitmap image correlates to a dot of the flexographic printing plate. For instance, pixels arranged in a straight line in the bitmap image will turn into a continuous straight line on the flexographic printing plate. For flexographic printing (also known as flexo-printing), a flexible printing plate with a relief image is usually wrapped around a cylinder and its relief image is inked using an anilox roller and the ink is transferred to a suitable printable medium.

Flexographic printing plates typically have a rubbery or elastomeric nature whose precise properties may be adjusted for each particular printable medium. In general the flexographic printing plate may be prepared by exposing a UV sensitive polymer layer through a photomask, or using other preparation techniques.

Catalytic inks that are useful for fabricating electrical devices using processes such as that described in the aforementioned U.S. Patent Application Publication 2014/0295063 are typically quite expensive. Therefore, supplying a large quantity of ink to fill the ink tray a flexographic printing system can be quite costly, particularly when the fine patterns of conductors require only relatively small amounts of ink. Similar issues arise with gravure printing systems. There remains a need for an inking system for a flexographic printing system or a gravure printing system that requires a low volume of ink.

SUMMARY OF THE INVENTION

The present invention represents an inking system for use in transferring ink to a flexographic printing plate in a flexographic printing system, including:
  an anilox member having a cylindrical outer surface, the outer surface including:
    a first recessed bearing contact zone;
    a second recessed bearing contact zone; and
    an ink transfer zone located between the first and second recessed bearing contact zones, the ink transfer zone having a plurality of cells, the cells being indentations in the outer surface of the cylinder configured to transfer ink to the flexographic printing plate;
  wherein a radius of the cylindrical outer surface in the first and second recessed bearing contact zones is less than a radius of the cylindrical outer surface in the ink transfer zone; and
  an ink tray assembly, including:
    an ink tray having a floor and first and second end walls; and
    first and second bearings mounted outside of the first and second end walls of the ink tray, respectively;
    wherein the first and second bearings engage with the first and second bearing contact zones, respectively, thereby positioning the ink tray assembly in a specified position relative to the anilox member;
    wherein upper edges of the first and second end walls extend into the first and second recessed bearing contact zones of the anilox member, respectively.

This invention has the advantage that a lower volume of ink is required to supply ink to the anilox roller than is necessary for conventional inking systems.

It has the additional advantage that the amount of ink that is wasted will be significantly reduced relative to conventional inking systems.

BRIEF DESCRIPTION OF THE DRAWINGS

It is to be understood that the attached drawings are for purposes of illustrating the concepts of the invention and may not be to scale. Identical reference numerals have been used, where possible, to designate identical features that are common to the figures.

DETAILED DESCRIPTION OF THE INVENTION

The present description will be directed in particular to elements forming part of, or cooperating more directly with, an apparatus in accordance with the present invention. It is to be understood that elements not specifically shown, labeled, or described can take various forms well known to those skilled in the art. It is to be understood that elements and components can be referred to in singular or plural form, as appropriate, without limiting the scope of the invention.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. It should be noted that, unless otherwise explicitly noted or required by context, the word "or" is used in this disclosure in a non-exclusive sense.

The example embodiments of the present invention are illustrated schematically and not necessarily to scale for the sake of clarity. One of ordinary skill in the art will be able to readily determine the specific size and interconnections of the elements of the example embodiments of the present invention.

References to upstream and downstream herein refer to direction of flow. Web media moves along a media path in a web advance direction from upstream to downstream. Similarly, fluids flow through a fluid line in a direction from upstream to downstream. In some instances, a fluid can flow in an opposite direction from the web advance direction. For clarification herein, upstream and downstream are meant to refer to the web motion unless otherwise noted.

Figure 1:
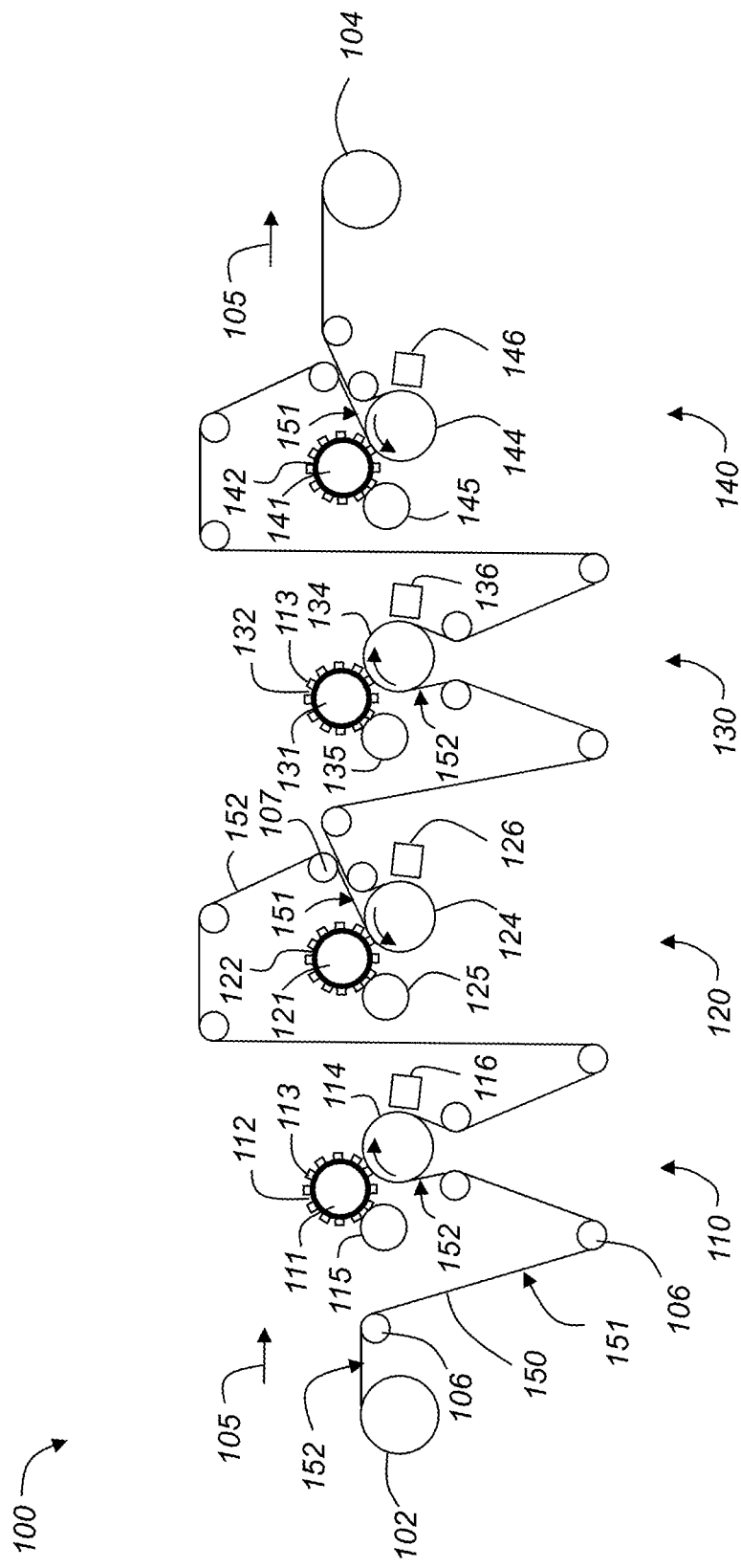
FIG. 1 is a schematic side view of a flexographic printing system for roll-to-roll printing on both sides of a substrate.

FIG. 1 is a schematic side view of a flexographic printing system 100 that can be used in some embodiments of the invention for roll-to-roll printing of a catalytic ink or a conductive ink on both sides of a substrate 150 for subsequent electroless plating. Substrate 150 is fed as a web from supply roll 102 to take-up roll 104 through flexographic printing system 100. Substrate 150 has a first side 151 and a second side 152.

The flexographic printing system 100 includes two print modules 120 and 140 that are configured to print on the first side 151 of substrate 150, as well as two print modules 110 and 130 that are configured to print on the second side 152 of substrate 150. The web of substrate 150 travels overall in process direction 105 (left to right in the example of FIG. 1). However, various rollers 106 and 107 are used to locally change the direction of the web of substrate as needed for adjusting web tension, providing a buffer, and reversing the substrate 150 for printing on an opposite side. In particular, note that in print module 120 roller 107 serves to reverse the local direction of the web of substrate 150 so that it is moving substantially in a right-to-left direction.

Each of the print modules 110, 120, 130, 140 includes some similar components including a respective plate cylinder 111, 121, 131, 141, on which is mounted a respective flexographic printing plate 112, 122, 132, 142, respectively. Each flexographic printing plate 112, 122, 132, 142 has raised features 113 defining an image pattern to be printed on the substrate 150. Each print module 110, 120, 130, 140 also includes a respective impression cylinder 114, 124, 134, 144 that is configured to force a side of the substrate 150 into contact with the corresponding flexographic printing plate 112, 122, 132, 142. Impression cylinders 124 and 144 of print modules 120 and 140 (for printing on first side 151 of substrate 150) rotate counter-clockwise in the view shown in FIG. 1, while impression cylinders 114 and 134 of print modules 110 and 130 (for printing on second side 152 of substrate 150) rotate clockwise in this view.

Each print module 110, 120, 130, 140 also includes a respective anilox roller 115, 125, 135, 145 for providing ink to the corresponding flexographic printing plate 112, 122, 132, 142. As is well known in the printing industry, an anilox roller is a hard cylinder, usually constructed of a steel or aluminum core, having an outer surface containing millions of very fine dimples, known as cells. Ink is provided to the anilox roller by a tray or chambered reservoir (not shown). In some embodiments, some or all of the print modules 110, 120, 130, 140 also include respective UV curing stations 116, 126, 136, 146 for curing the printed ink on substrate 150.

Figure 2:
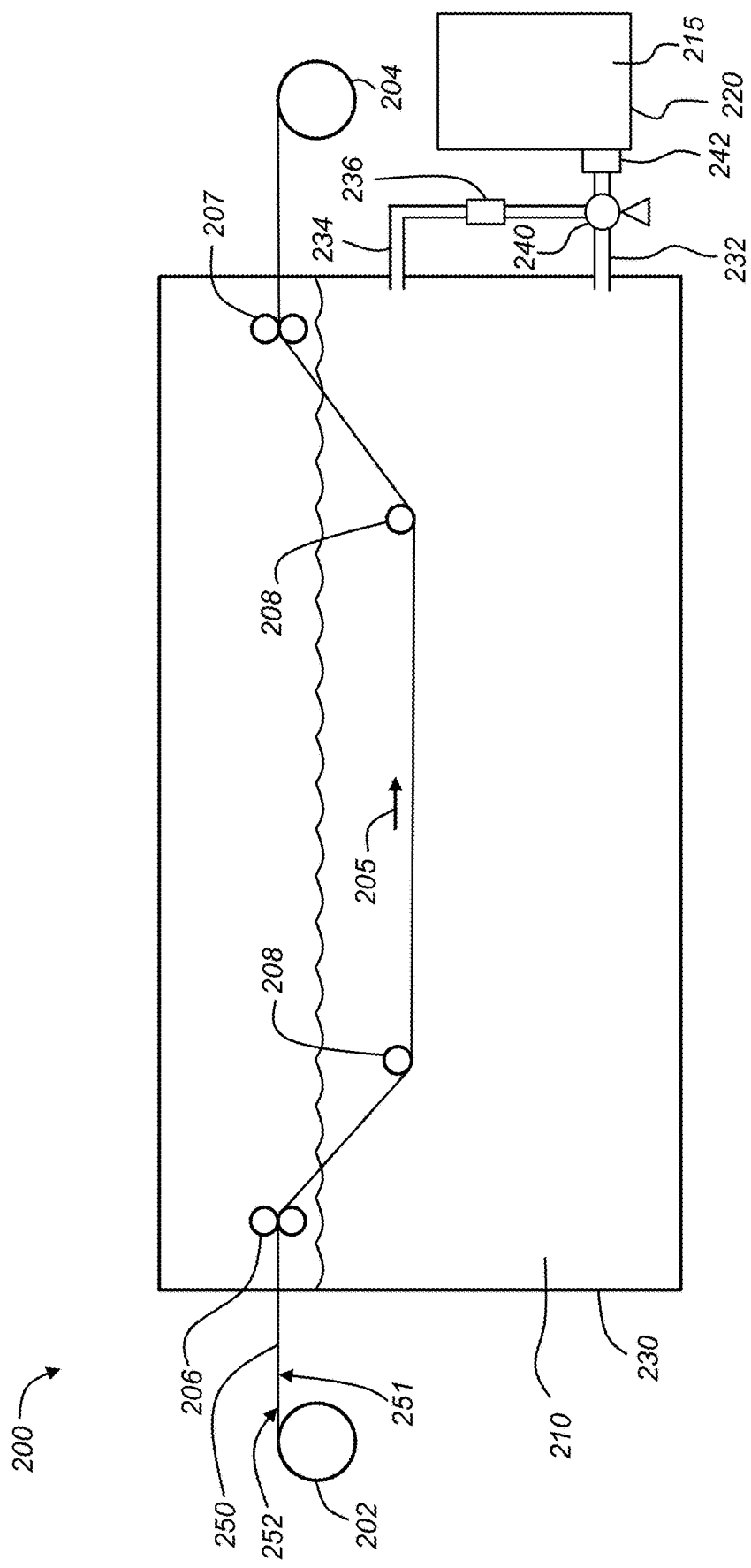
FIG. 2 is a schematic side view of a roll-to-roll electroless plating system.

FIG. 2 is a schematic side view of a roll-to-roll electroless plating system 200 disclosed in commonly-assigned U.S. Patent Application Publication 2016/0168713 to Reuter et al., which is incorporated herein by reference. The electroless plating system 200 includes a tank 230 of plating solution 210. Web of media 250 is fed by a web advance system along a web-transport path in an in-track direction 205 from a supply roll 202 to a take-up roll 204. The web of media 250 is a substrate upon which electroless plating is to be performed. Drive roller 206 is positioned upstream of the plating solution 210 and drive roller 207 is positioned downstream of the plating solution 210. Drive rollers 206 and 207 advance the web of media 250 from the supply roll 202 through the tank of plating solution 210 to the take-up roll 204. Web-guiding rollers 208 are at least partially submerged in the plating solution 210 in the tank 230 and guide the web of media 250 along the web-transport path in the in-track direction 205.

As the web of media 250 is advanced through the plating solution 210 in the tank 230, a metallic plating substance such as copper, silver, gold, nickel or palladium is electrolessly plated from the plating solution 210 onto predetermined locations on one or both of a first surface 251 and a second surface 252 of the web of media 250. As a result, the concentration of the metal or other components in the plating solution 210 in the tank 230 decreases and the plating solution 210 needs to be refreshed. To refresh the plating solution 210, it is recirculated by pump 240, and replenished plating solution 215 from a reservoir 220 is added under the control of controller 242, which can include a valve (not shown). In the example shown in FIG. 2, plating solution 210 is moved from tank 230 to pump 240 through a drain pipe 232 and is returned from pump 240 to tank 230 through a return pipe 234. In order to remove particulates from plating solution 210, a filter 236 can be included, typically downstream of the pump 240.

Figure 3:
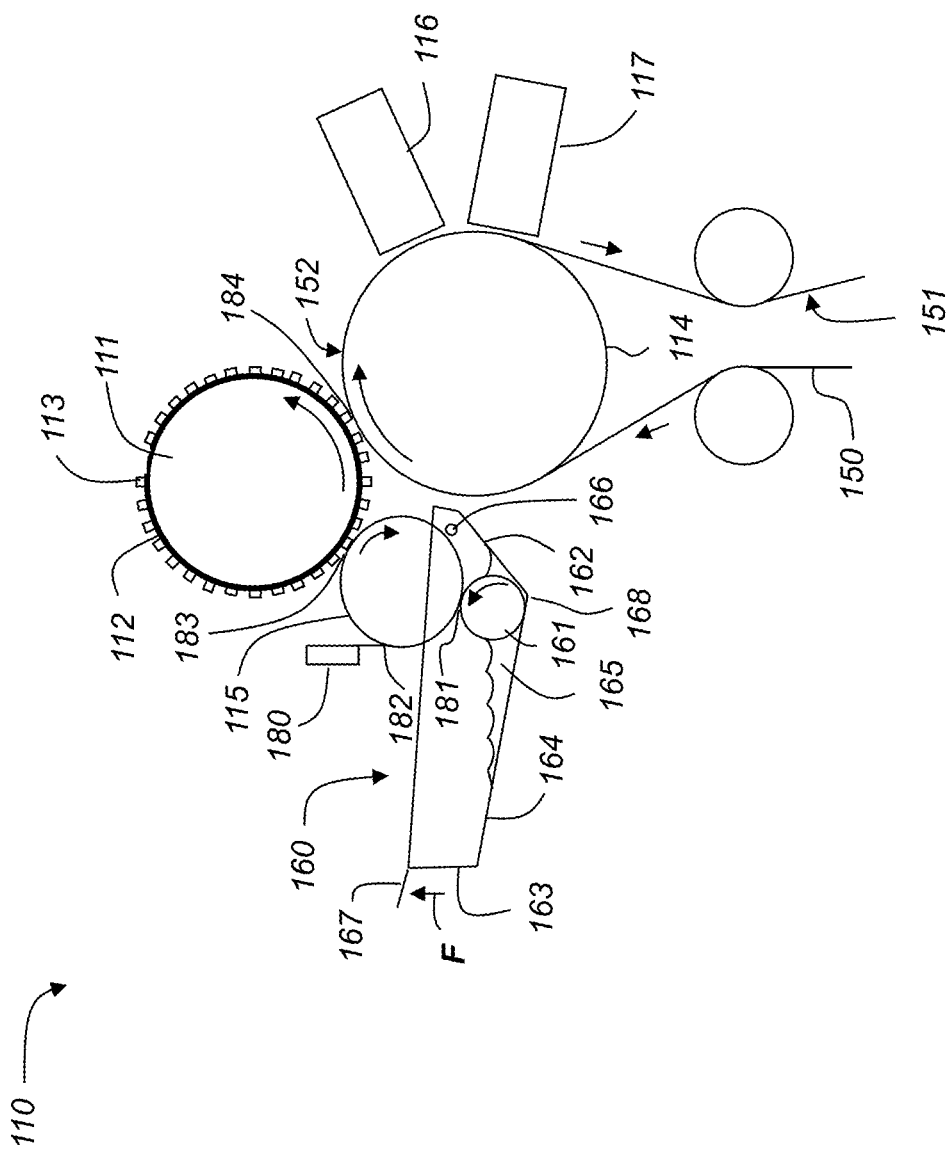
FIG. 3 is a schematic side view of an exemplary printing module in a flexographic printing system.

FIG. 3 shows a close-up side view showing additional details of an exemplary embodiment of the print module 110 of FIG. 1. The illustrated configuration is equivalent to that disclosed in commonly-assigned U.S. Pat. No. 9,327,494 to G. Smith et al., entitled "Flexographic printing system with pivoting ink pan," which is incorporated herein by reference. The print module 110 includes an ink pan 160 with a fountain roller 161 for providing ink to the anilox roller 115. Ink pan 160 includes a front wall 162 located nearer to impression cylinder 114, a rear wall 163 located opposite front wall 162 and further away from impression cylinder 114, and a floor 164 extending between the front wall 162 and the rear wall 163. The ink pan 160 also includes two side walls (not shown in FIG. 3) that extend between the front wall 162 and the rear wall 163 on opposite sides of the ink pan 160 and intersect the floor 164. It should be noted that there may or may not be distinct boundaries between the front wall 162, the rear wall 163, the floor 164 and the side walls. In some embodiments, some or all of the boundaries between these surfaces can be joined using rounded boundaries that smoothly transition from one surface to the adjoining surface.

Fountain roller 161 is partially immersed in an ink 165 contained in ink pan 160. Within the context of the present invention, the ink 165 can be any type of marking material, visible or invisible, to be deposited by the flexographic printing system 100 (FIG. 1) on the substrate 150. Fountain roller 161 is rotatably mounted on ink pan 160. Ink pan 160 is pivotable about pivot axis 166, preferably located near the front wall 162.

A lip 167 extends from rear wall 163. When an upward force F is applied to lip 167 as in FIG. 3, ink pan 160 pivots upward about pivot axis 166 until fountain roller 161 contacts anilox roller 115 at contact point 181. In the upwardly pivoted ink pan 160 the floor 164 tilts downward from rear wall 163 toward the front wall 162 so that fountain roller 161 is located near a lowest portion 168 of floor 164. If upward force F is removed from lip 167, ink pan 160 pivots downward under the influence of gravity so that fountain roller 161 is no longer in contact with anilox roller 115.

A flexographic printing plate 112 (also sometimes called a flexographic master) is mounted on plate cylinder 111. In an exemplary configuration, the flexographic printing plate 112 is a flexible plate that is wrapped almost entirely around plate cylinder 111. Anilox roller 115 contacts raised features 113 on the flexographic printing plate 112 at contact point 183. As plate cylinder 111 rotates counter-clockwise (in the view shown in FIG. 3), both the anilox roller 115 and the impression cylinder 114 rotate clockwise, while the fountain roller 161 rotates counter-clockwise. Ink 165 that is transferred from the fountain roller 161 to the anilox roller 115 is transferred to the raised features 113 of the flexographic printing plate 112 and from there to second side 152 of substrate 150 that is pressed against flexographic printing plate 112 by impression cylinder 114 at contact point 184.

In order to remove excess amounts of ink 165 from the patterned surface of anilox roller 115 a doctor blade 180, which is mounted to the frame (not shown) of the printing system, contacts anilox roller 115 at contact point 182. Contact point 182 is downstream of contact point 181 and is upstream of contact point 183. For the configuration shown in FIG. 3, in order to position doctor blade 180 to contact the anilox roller 115 downstream of contact point 181 where the fountain roller 161 contacts the anilox roller 115, as well as upstream of contact point 183 where the anilox roller 115 contacts the raised features 113 on the flexographic printing plate 112, doctor blade 180 is mounted on the printer system frame on a side of the anilox roller 115 that is opposite to the impression cylinder 114.

After printing of ink on the substrate, it is cured using UV curing station 116. In some embodiments, an imaging system 117 can be used to monitor line quality of the pattern printed on the substrate.

Figure 4:
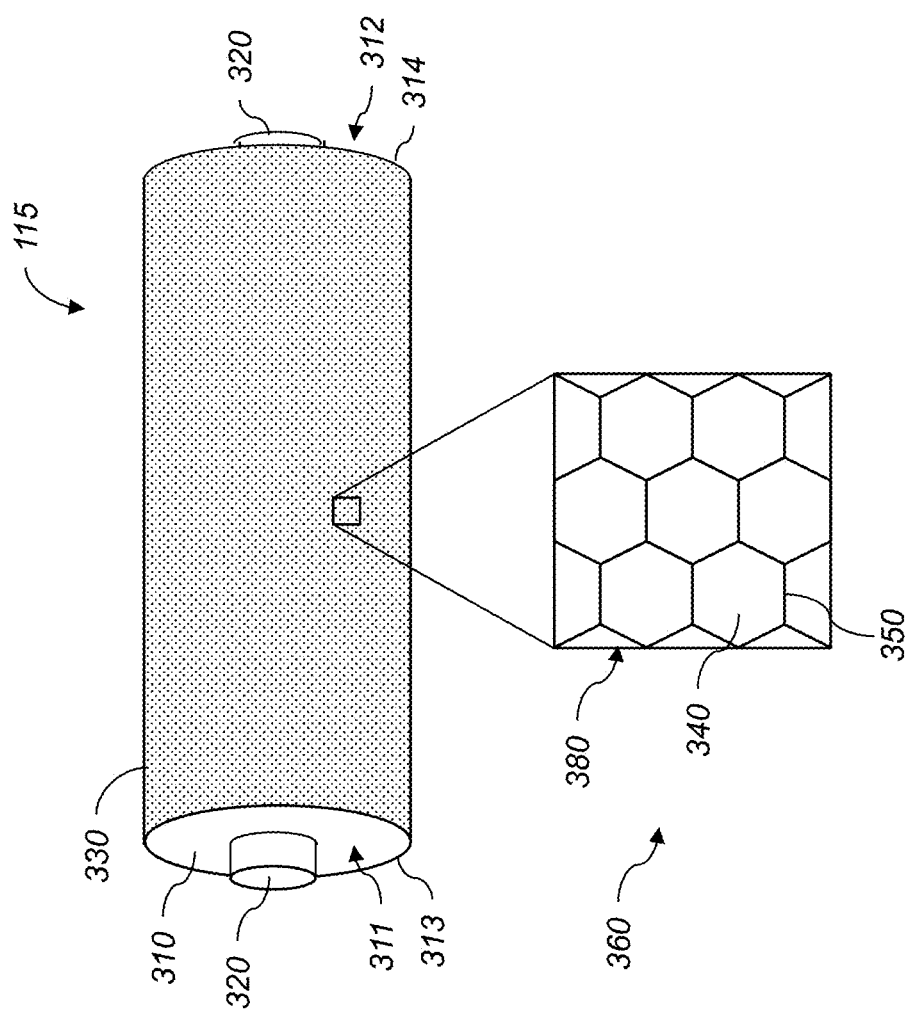
FIG. 4 shows a conventional anilox roller used in flexographic printing processes.

FIG. 4, shows a conventional anilox roller 115 used in a flexographic printing process. The anilox roller 115 controls, in part, the volume of ink or other material transferred to a flexographic printing plate 112 (FIG. 3) during the flexographic printing process. The anilox roller 115 includes a rigid cylinder 310, which is typically constructed of steel, a carbon fiber composite, a carbon fiber composite covered with metal, chrome, or an aluminum core with steel. Roller mounts 320 are disposed on the distal ends 311, 312 of cylinder 310 to secure and rotate the cylinder 310 during the flexographic printing process. Prior to depositing a surface coating 330, the cylinder 310 is typically polished so that a longitudinal contact surface around cylinder 310 is smooth. The surface coating 330 is typically a hard ceramic, but can also be made of other materials such as chrome. After deposition, the surface coating 330 is preferably polished so that a longitudinal contact surface of surface coating 330 around cylinder 310 is smooth. The surface coating 330 is polished smooth because it is the contact surface of the cylinder.

An anilox roller pattern 380 including a plurality of cells 340 separated by walls 350 are patterned into the surface coating 330 as shown in close-up view 360. The cells 340 do not extend into the cylinder 310. Each cell 340 is a small indentation of a predetermined geometry in the surface coating 330 that holds and controls the amount of ink or other material (not shown) to be transferred to the flexographic printing plate 112 during the flexographic printing process. For the cell geometry depicted in FIG. 4, a given cell 340 shares common walls 350 with six neighboring cells 340. However, the number of common walls 350 shared by a given cell 340 may vary depending on the geometry of the cell 340 used in a particular application. Those skilled in the art will recognize that the cells 340 can be formed into the surface coating 330 with a variety of different processes such as etching processes and engraving process.

Figure 5:
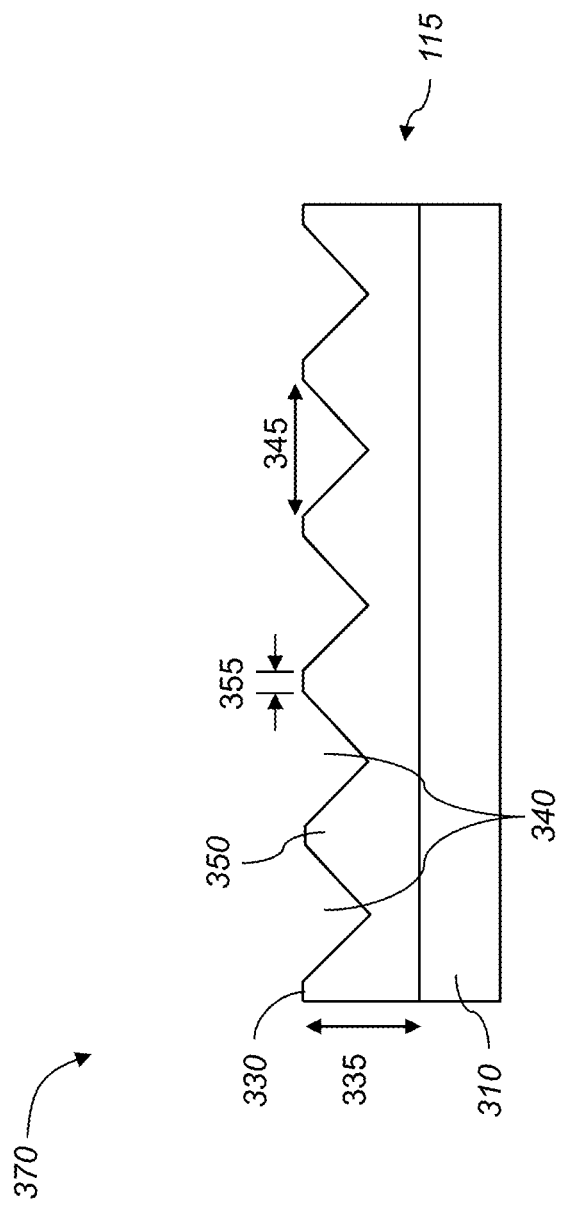
FIG. 5 shows a cross-sectional view through a surface of the anilox roller of FIG. 4.

FIG. 5, shows a cross-sectional view 370 through a surface of the anilox roller 115 of FIG. 4. The surface coating 330 (e.g., a ceramic coating) covers the longitudinal contact surface of cylinder 310, and generally has a thickness 335 of at least 10 microns. A plurality of cells 340 are patterned into the surface coating 330, but do not extend into cylinder 310. The volume of ink or other material (not shown) held by a given cell 340 is typically measured in units of Billion Cubic Microns ("BCMs"). A cell 340 typically holds a volume of at least 0.5 BCM or more of ink or other material suitable for printing standard geometry lines and features. Each cell 340 typically has a cell size 345 of 10 microns or more.

In the depicted cross-section, a common wall 350 is formed between adjacent cells 340 patterned into surface coating 330. The wall 350 is composed entirely of surface coating 330 and has a wall thickness 355, which is typically related to the cell density. As the cell density increases, the thickness 355 of the wall 350 generally decreases. If the thickness 355 of wall 350 becomes too thin, it may break from contact with the doctor blade or the flexographic printing plate during the flexographic printing process or wear out over time from repeated use. If the wall 350 between adjacent cells 340 breaks, a substantially larger cell will be formed, resulting in inconsistent ink transfer volumes. Inconsistent ink transfer volumes can result in print quality issues due to excess inking. Consequently, the cell density may be limited by a minimally sufficient wall thickness 355 that is necessary for reliable use. Typically, the wall 350 has a thickness 355 of 1 micron or more for printing standard geometry lines and features. For example, in one example, the sum of the wall thickness 355 and the cell size 345 of an anilox roller 115 configured to deliver 0.5 BCM with 2000 lpi (lines per inch) is 12.7 microns, with the wall thickness 355 at approximately 1-2 microns and the cell size 345 at approximately 10.7-11.7 microns. For anilox rollers with lower cell density (or lpi), the cell size 345 will increase accordingly.

Figure 6:
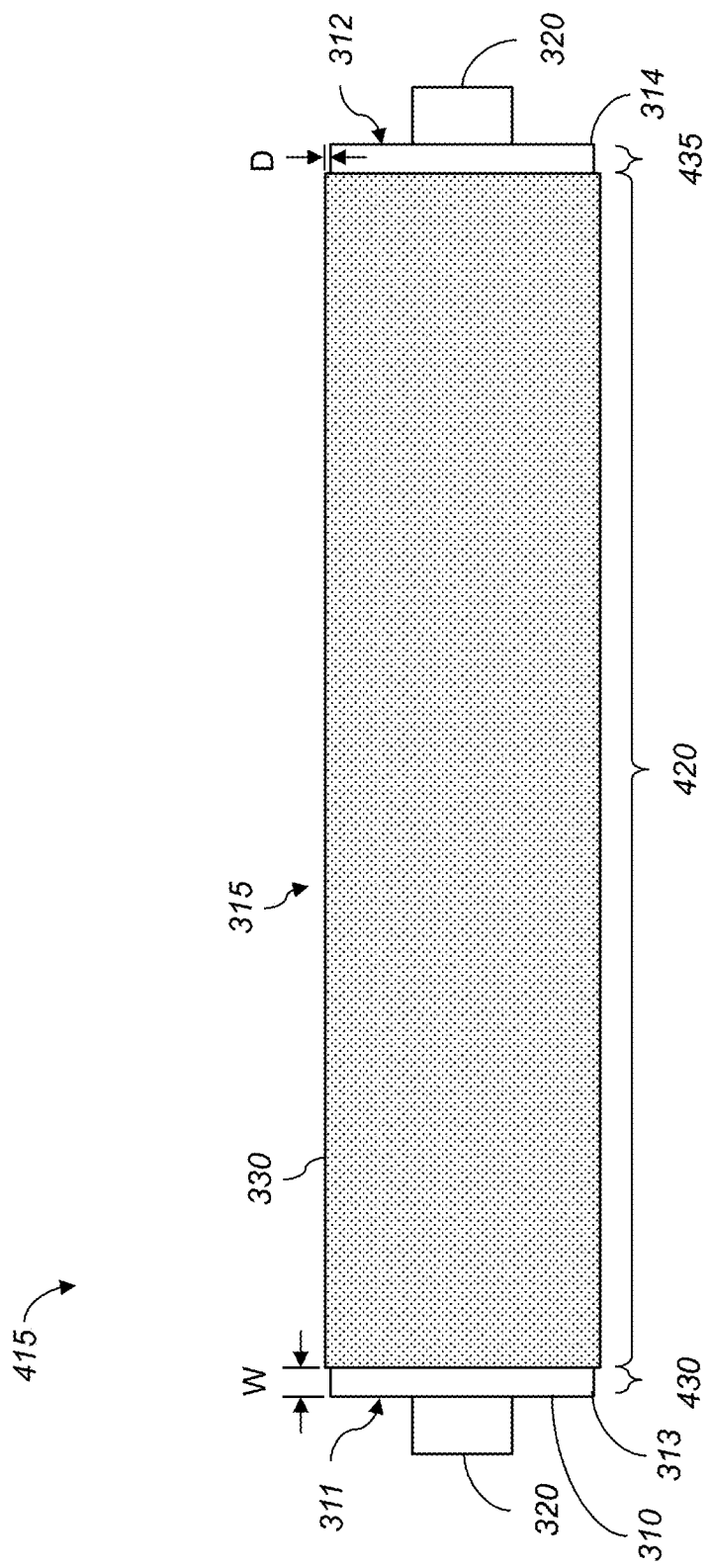
FIG. 6 illustrates an anilox roller which includes non-contact zones on the ends of the cylinder on either side of an ink transfer zone.

FIG. 6, taken from commonly assigned, co-pending U.S. patent application Ser. No. 16/032,376, entitled: "Anilox roller with non-contact end zones," by G. Smith, which is incorporated herein by reference, illustrates an anilox roller 415 having cells 340 (FIG. 5) formed in a surface coating 330 on the outer surface 315 of a cylinder 310. The anilox roller 415 includes reduced radius non-contact zones 430, 435 at the ends 311, 312 of the anilox roller 415 on either side of an ink transfer zone 420. Roller mounts 320 are used to mount the anilox roller 415 in a flexographic printing system 100 (FIG. 1). Such anilox rollers 415 have been found to have a reduced susceptibility to the formation of chips in the ceramic material typically used to form the surface coating 330, particularly along the edges 313, 314 at the ends 311, 312 of the anilox roller 415.

Flexographic printing systems 100 (FIG. 1) can be used to print electrical devices using catalytic inks or conductive inks using processes such as that described in the aforementioned U.S. Patent Application Publication 2014/0295063. Such inks tend to be very expensive, and therefore filling a traditional ink pan 160 (FIG. 3) with ink 165 can represent a significant cost. The patterns of fine lines associated with many electrical devices require only a small volume of ink. Therefore, the ink 165 in the ink pan 160 is used at a very slow rate, and waste can be a significant issue. Therefore, an inking system for a flexographic printing system 100 that can operate reliably with a smaller volume of ink can provide significant cost savings.

Figure 7:
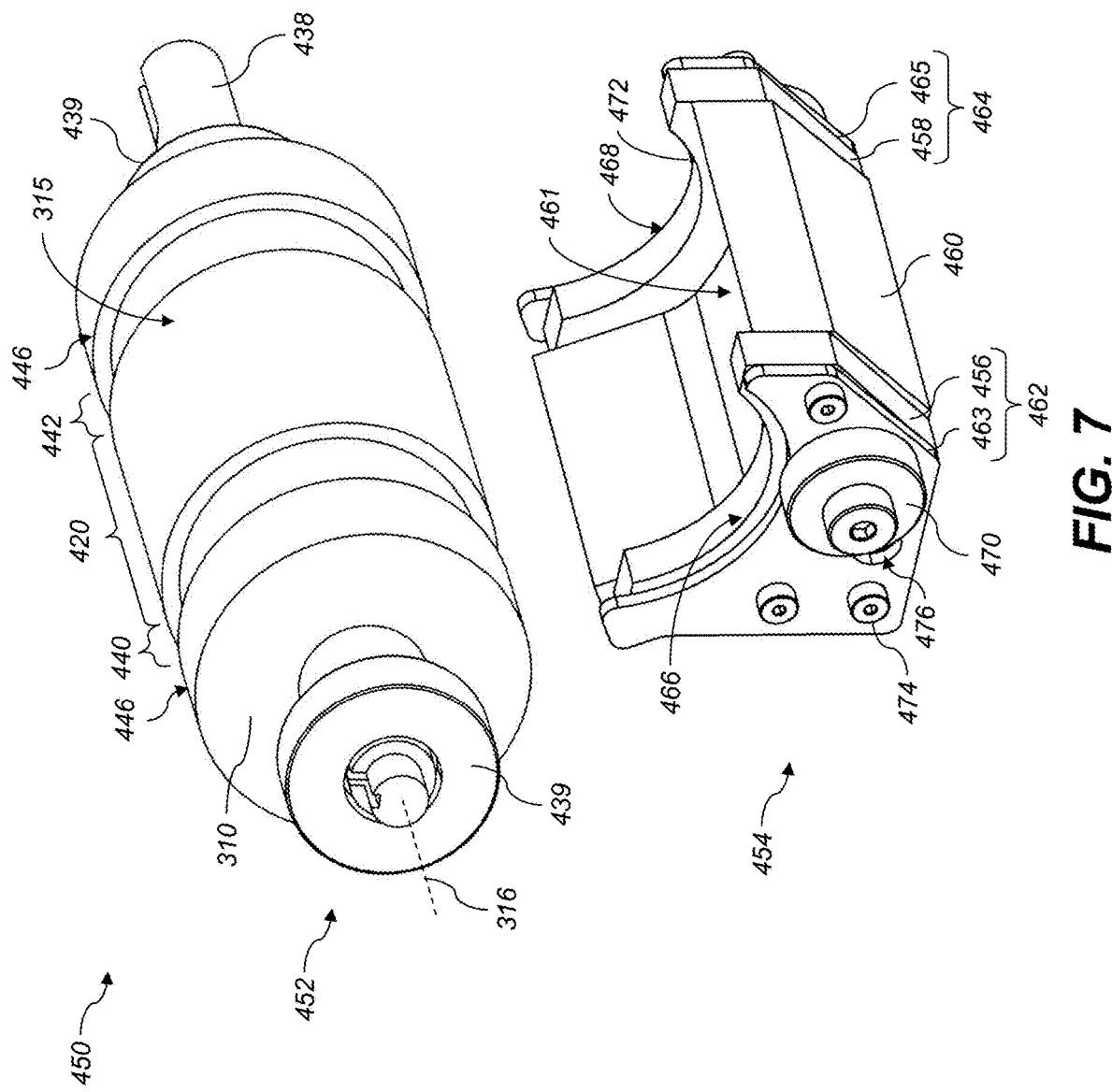
FIGS. 7-8 illustrate an improved inking system including an anilox roller and ink tray assembly in accordance with an exemplary embodiment.

FIG. 7 illustrates the components of an exemplary inking system 450 in accordance with an exemplary embodiment. The inking system 450 includes a specially designed anilox roller 452 with a cylindrical outer surface 315, together with a corresponding ink tray assembly 454.

The anilox roller 452 is a rigid cylinder 310 having a cylindrical outer surface 315 and a roller axis 316. The cylinder 310 is typically constructed of steel, a carbon fiber composite, a carbon fiber composite covered with metal, chrome, or an aluminum core with steel. In the illustrated embodiment, the anilox roller 452 has a shaft 438 which extends out both ends of the cylinder 310. The anilox roller 452 also includes bearings 439 within which the shaft 438 freely rotates.

The anilox roller 452 has some features in common with the anilox roller 415 of FIG. 6 which was described in the aforementioned U.S. patent application Ser. No. 16/032,376. Notably, the outer surface 315 of the anilox roller 452 has a central ink transfer zone 420 surrounded by two recessed regions. In this case, the recessed regions form bearing contact zones 440, 442 which are adapted to engage with bearings 470, 472 of the ink tray assembly 454.

The ink transfer zone 420 includes a plurality of cells 340 (FIG. 4), the cells 340 being indentations in the outer surface 315 of the cylinder 310 which are configured to transfer ink from the ink tray assembly 454 to the flexographic printing plate 112 (FIG. 3). As discussed earlier, the cells are generally formed in a surface coating 330 (FIG. 4), which is typically a hard ceramic, but can also be made of other materials such as chrome.

In the illustrated configuration, the anilox roller 452 includes non-recessed zones 446 outside of the recessed bearing contact zones 440, 442, however these are not required for the operation of the inking system 450. For example, the recessed bearing contact zones 440, 442 may be positioned at opposite ends of the anilox roller 452 adjacent to the ends of cylinder 310, similar to the anilox roller 415 of FIG. 6. The non-recessed zones 446 may or may not include cells 340. For example, if the anilox roller 452 is manufactured by taking a conventional anilox roller 115 (FIG. 4) and using a lathe to machine the bearing contact zones 440, 442, then the non-recessed zones 446 would typically include the cells 340 that were on the outer surface 315 of the anilox roller 115.

The radius of the cylindrical outer surface 315 in the first and second bearing contact zones 440, 442 is less than the radius of the cylindrical outer surface in the ink transfer zone 420 to provide the recessed regions. (Note that even though the cylinder 310 is not strictly cylindrical and the outer surface 315 is not strictly a "cylindrical outer surface" due to the radius differences, it will still be referred to as a "cylinder" with a "cylindrical outer surface." Within the context of the present specification, the terminology "cylindrical outer surface" includes surfaces having a plurality of zones, where the outer surface within each zone is cylindrical.) Preferably, the radii differ by at least 0.015 inches such that first and second end walls 462, 464 of ink tray 460 can be positioned to extend into the first and second recessed bearing contact zones 440, 442, respectively. More preferably, the radii differ by more than 0.050 inches, and even more preferably by at least 0.100 inches. In an exemplary embodiment, the radius of the ink transfer zone 420 is 2.97 inches and the radius of the bearing contact zones 440, 442 is 2.60 inches, corresponding to a difference of 0.37 inches.

The anilox rollers 452 of the present invention can be fabricated in a variety of ways. In one embodiment, a conventional anilox roller 115 such as that shown in FIG. 4 is purchased or fabricated using conventional processes well-known to those skilled in the art. A machining operation is then used to reduce the radius of the anilox roller 115 in the bearing contact zones 440, 442 to provide an improved anilox roller 452 in accordance with the present invention. For example, the conventional anilox roller 115 can be mounted on a lathe and a machining tool can be used to reduce the radius by removing material in the bearing contact zones 440, 442. In other embodiments, the cylinder 310 can be machined (e.g., with a lathe) to provide appropriate radii in the different zones before the surface coating 330 (FIG. 5) is applied and the cells 340 are formed in the ink transfer zone 420. It will obvious that any other appropriate machining operation known in the art can be used to reduce the radius in the non-contact zones in accordance with the present invention.

The ink tray assembly 454 includes an ink tray 460 having a floor 461 and first and second end walls 462, 464. In an exemplary embodiment, the end walls 462, 464 include first and second rigid end wall plates 463, 465, respectively. First and second bearings 470, 472 are mounted outside of the first and second end walls 462, 464, respectively. In an exemplary configuration, the bearings 462, 464 of the present invention are wheels that rotate freely around a bearing axis and are adapted to engage with and support the anilox roller 452 while enabling it to rotate freely around its roller axis 316. It will be obvious to one skilled in the art that other types of bearings can alternatively be used to provide these functions in accordance with the present invention. In the illustrated configurations, the bearings 470, 472 are mounted directly to the end wall plates 463, 465, respectively.

The first and second bearings 470, 472 of the ink tray assembly 454, are configured to engage with the first and second bearing contact zones 440, 442, respectively, of the anilox roller 452, thereby positioning the ink tray assembly 454 in a specified position relative to the anilox roller 452. The bearings 470, 472 extend above the upper edges 466, 468 of the end wall plates 463, 465 so that the end wall plates 463, 465 do not contact the bearing contact zones 440, 442 of the anilox roller 452. In an exemplary embodiment, a force mechanism (not shown) supplies a force F that pushes the ink tray assembly 454 against the anilox roller 452 with a specified force in order to engage the bearings 470, 472 with the bearing contact zones 440, 442. Any appropriate force mechanism known in the art can be used in accordance with the present invention. Examples of force mechanisms that can be used to provide the force F would include springs and pneumatic cylinders.

The end walls 462, 464 optionally include end seals 456, 458. The end seals 456, 458 are made of a compressible material such as a polyethylene foam. When the anilox roller 452 is engaged with the ink tray assembly 454, the ends of the ink transfer zone 420 press down against the end seals 456, 458 to prevent ink from flowing over the end wall plates 463, 465. In an exemplary embodiment, the end seals 456, 458 are held in place by the end wall plates 463, 465, which are fastened to the ink tray 460 using bolts 474, which pass through holes in the end wall plates 463, 465 and the end seals 456, 458. The end seals 456, 458 will generally extend into the recessed bearing contact zones 440, 442, and may in fact extend further than the end walls 462, 464. In some configurations, the end seals 456, 458 may actually contact the bearing contact zones 440, 442. The end seals 456, 458 are considered to be components of the end walls 462, 464. Accordingly, the end walls 462, 464 can be said to extend into the recessed bearing contact zones 440, 442 if the end seals 456, 458 extend into recessed bearing contact zones 440, 442 but the upper edges 466, 468 of the end wall plates 463, 465 do not actually extend into recessed bearing contact zones 440, 442.

Figure 8:
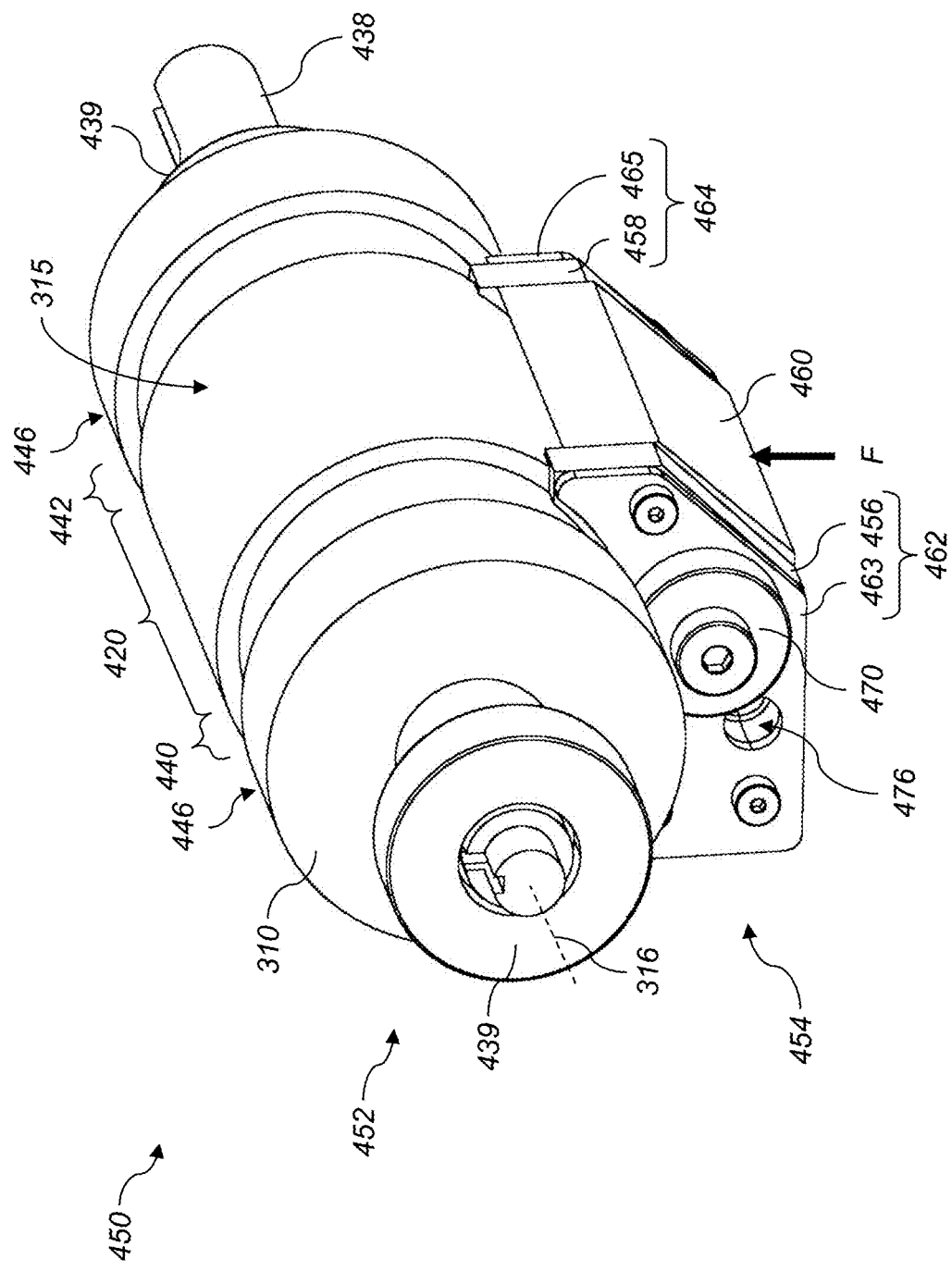

When the anilox roller 452 is engaged with the ink tray assembly as shown in FIG. 8, upper edges 466, 468 of the first and second end walls 462, 464 extend into the first and second recessed bearing contact zones 440, 442 of the anilox roller 452, respectively. The amount that the end wall plates 463, 465 extend into the recessed bearing contact zones 440, 442 is generally less than depth bearing contact zones 440, 442 so that there is some clearance (e.g., at least 0.005 inches) between the upper edges 466, 468 of the end wall plates 463, 465 and the outer surface 315 of the anilox roller 452 in the bearing contact zones 440, 442.

The inking system 450 can be mounted in the flexographic printing system 100 (FIG. 1) using any appropriate mechanism. In an exemplary configuration, a shaft is inserted through a mounting hole 476 to retain the inking system 450 in position.

Figure 9:
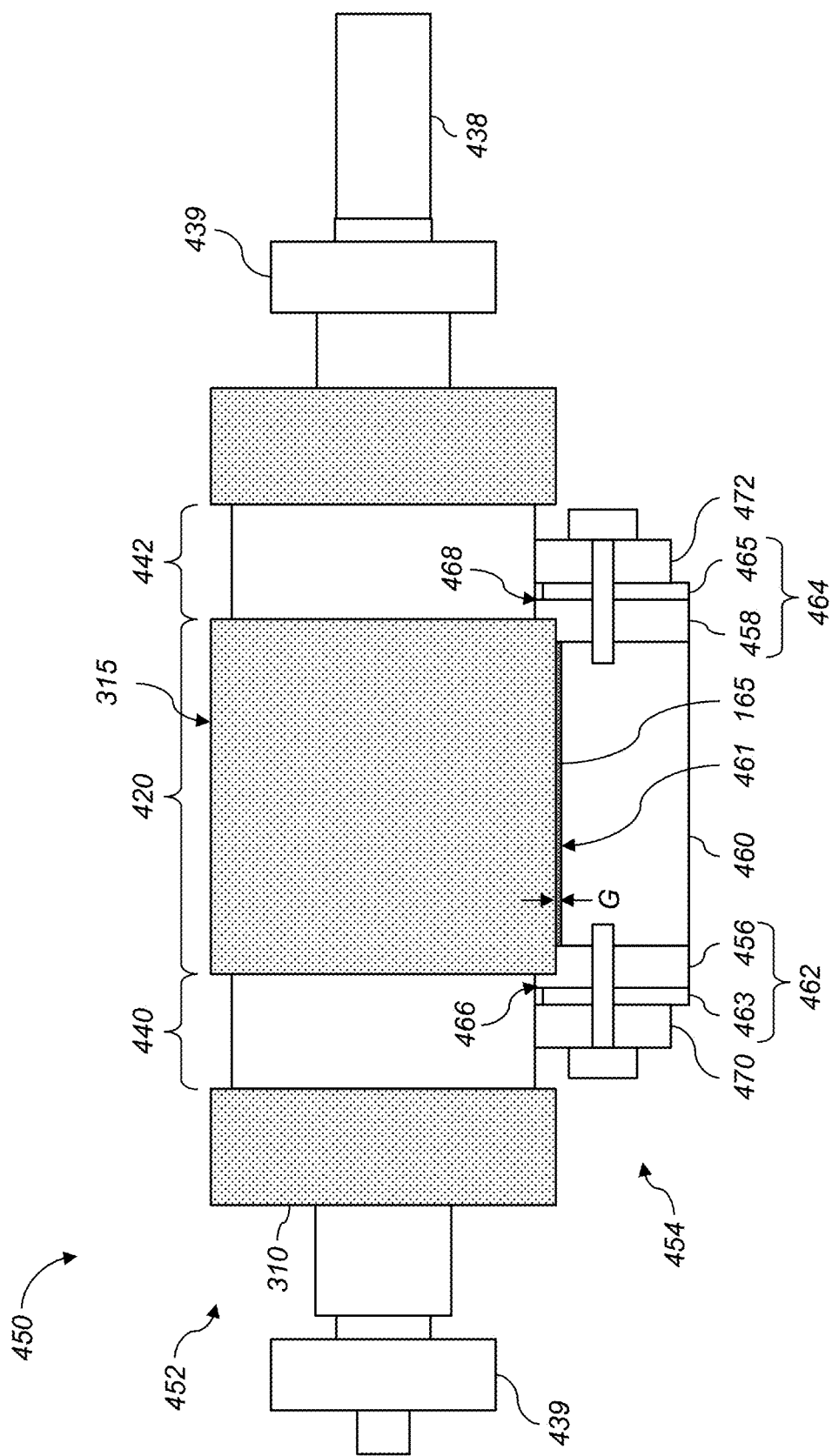
FIGS. 9-10 illustrate cross-section views through the improved inking system of FIG. 8.

FIG. 9 shows a vertical cross-section through the inking system 450 of FIG. 8 taken through the roller axis 316 of the anilox roller 452 which illustrates additional details of the exemplary embodiment. It can be seen that the bearings 470, 472 of the ink tray assembly engage with the bearing contact zones 440, 442 of the anilox roller 452. This positions the anilox roller 452 in a specified position relative to the ink tray assembly 454 to provide a controlled gap G between the outer surface 315 of ink transfer zone 420 and the floor 461 of the ink tray 460. Preferably, the minimum gap between the floor 461 of ink tray 460 and the outer surface 315 is in the range of 0.005≤G≤0.500 inches. In an exemplary embodiment, the gap is about 0.100 inches. The ideal gap for a particular embodiment will depend on the viscosity of the ink 165. Larger gaps are appropriate for more viscous inks 165 in order to prevent the anilox roller 452 from pushing the ink 165 out of the gap region.

It can be seen that the end walls 462, 464 of the ink tray 460 extend into the recessed bearing contact zones 440, 445 of the anilox roller 452. This functions to retain the ink 165 in the ink tray 460. The bearings 470, 472 should generally extend above the upper edges 466, 468 of the end wall plates 463, 465 so that the bearing contact zones 440, 445 do not contact the end wall plates 463, 465.

Figure 10:
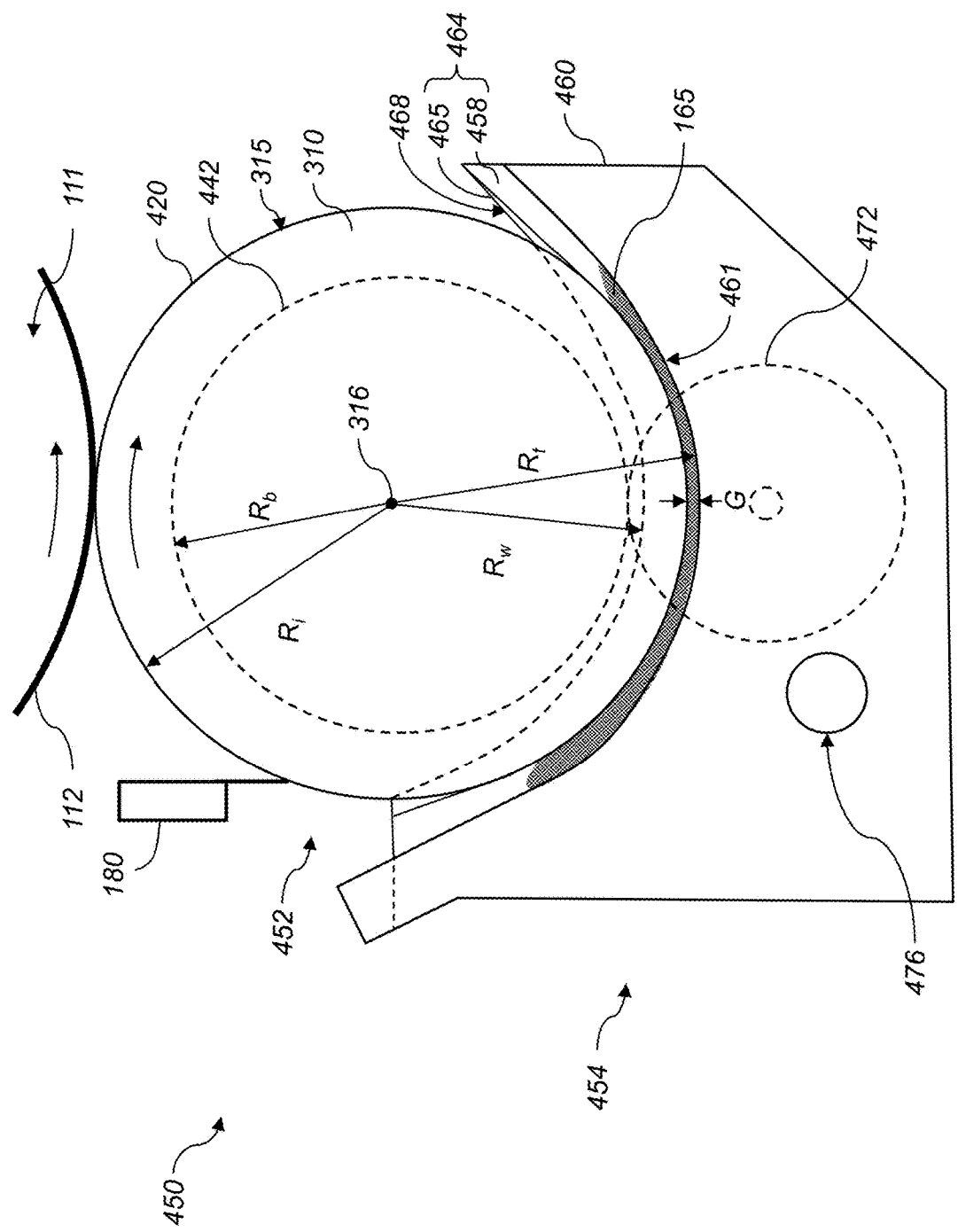

FIG. 10 shows a vertical cross-section through the inking system 450 of FIG. 8 taken in a plane perpendicular to the roller axis 316 of the anilox roller 452 which illustrates additional details of the exemplary embodiment. It can be seen that the bearings 470, 472 engage with the bearing contact zones 440, 442 of the anilox roller 452, thereby positioning the ink tray assembly 454 in a specified position relative to the anilox roller 450 to provide a controlled gap G. (Note that only one bearing 472 and one bearing contact zone 442 is shown in FIG. 10.) A supply of ink 461 is placed in the ink tray 460 and fills a region between the anilox roller 452 and the floor 461 of the ink tray 460. The small gap between the anilox roller 452 and the floor 461 of the ink tray 460 means that a relatively small volume of ink 461 is required to ensure that the outer surface 315 of the anilox roller 452 in the ink transfer zone 420 is submerged in the ink 461, so that the cells 340 (FIG. 5) on the outer surface 315 are filled with ink 461 which is transferred to the flexographic printing plate 112 on the plate cylinder 111. Since the electrode patterns for many electrical devices that are typically printed using this configuration have a very small area, a large number of devices can be printed with only a small volume of ink 461.

The anilox roller 452 has a radius $R_i$ in the ink transfer zone 420. In the illustrated embodiment, the floor 461 of the ink tray 460 has a curved portion with a tray radius of curvature $R_t$ in the vicinity of the bottom of the anilox roller 452 where the minimum gap occurs. In an exemplary configuration, $R_t > R_i$ and the curved portion of the floor 461 in this region has a center of curvature located in proximity to the roller axis 316. This provides a substantially uniform gap between the anilox roller 452 and the floor 461 of the ink tray 460 for a region near the bottom of the anilox roller 452. Note that the radius of the curvature and the center of curvature of the curved portion of the floor 461 may vary with position. An important design principle is that there should be a controlled gap between the anilox roller 452 and the floor 461 of the ink tray 460, where the gap has a specified minimum G, and the gap is relatively small (e.g., less than about 2×G) in the region filled with ink 461 to minimize the required ink volume.

The anilox roller 452 has a radius $R_b$ in the bearing contact zones 440, 442. In the illustrated embodiment, the upper edges 466, 468 of the end wall plates 463, 465 have curved portions having a radius of curvature $R_w$ in the vicinity of the bottom of the anilox roller 452. (Note that only one bearing contact zone 442 and one end wall plate 465 is shown in FIG. 10.) In an exemplary configuration, $R_t > R_w > R_b$ and the curved portion of the upper edges 466, 468 in this region have a center of curvature located in proximity to the roller axis 316. Note that the radius of the curvature and the center of curvature of the curved portion of the upper edges 466, 468 may vary with position, or the upper edges 466, 468 of the end wall plates 463, 465 may have a different profile altogether (e.g., non-curved edges). Typically, the end wall plates 463, 465 will extend into the recessed bearing contact zones to hold the end seals 456, 458 in position, but they should be configured so that they do not contact the anilox roller 452.

Figure 11:
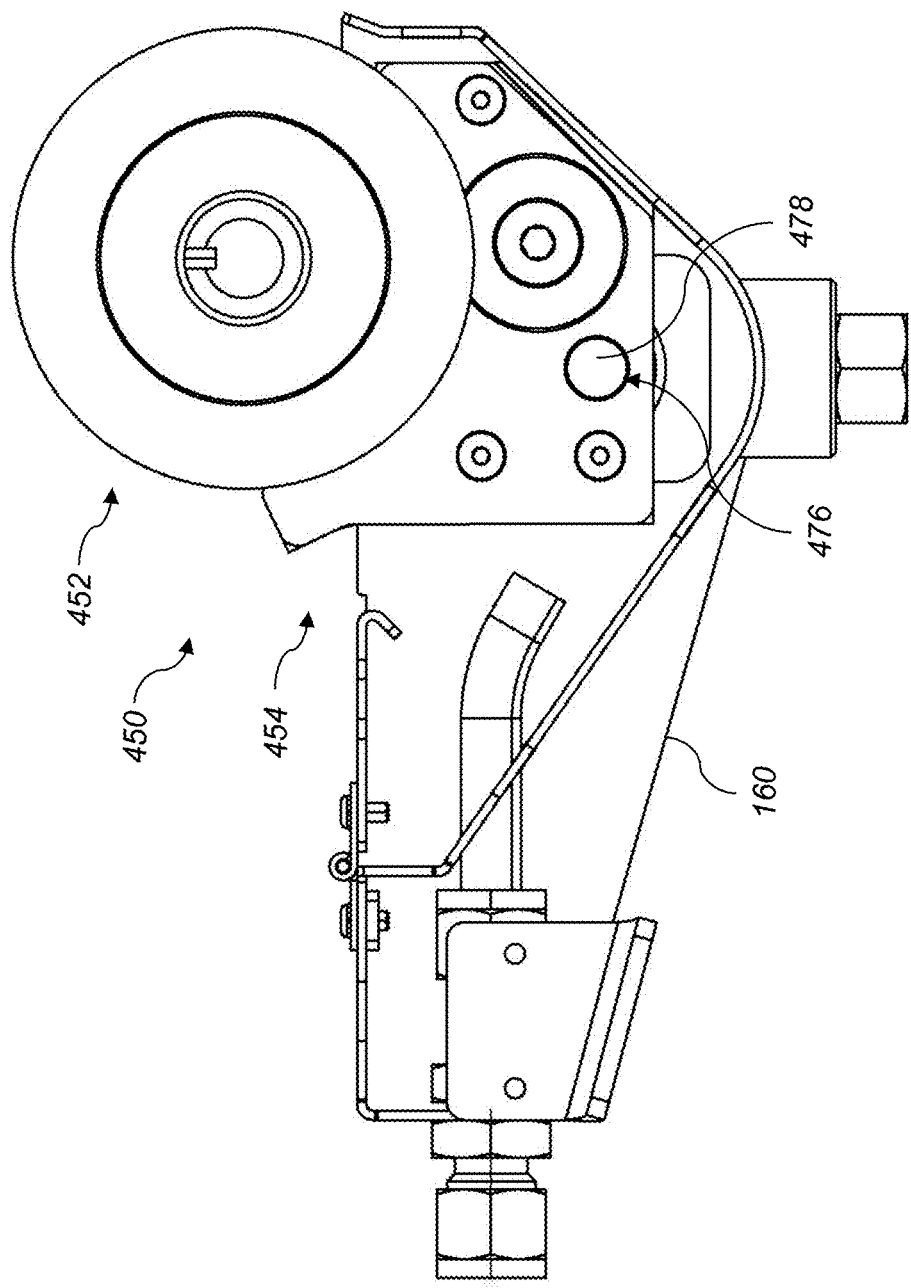
FIG. 11 illustrates an improved inking system mounted within a conventional ink pan.

In some applications, the cross-track width of the content on the flexographic printing plate 112 may be relatively small. In such cases, the cross-track width of the ink transfer zone 420 only needs to be wide enough to ink the appropriate portion of the flexographic printing plate 112. The improved inking system 450 of the present invention is well suited to such applications since the cross-track width of the ink transfer zone 420 and the ink tray 460 can easily be controlled independent of the total cross-track width of the anilox roller 452. This makes it possible to retrofit a conventional print module 110 (FIG. 3) in a flexographic printing system 100 (FIG. 1) with the improved inking system 450. In some embodiments, the inking system 450 can be designed so that it fits within the conventional ink pan 160 of FIG. 3, replacing the fountain roller 161 and the conventional anilox roller 115. Within the context of the present invention, a conventional ink pan 160 is one which is adapted to supply ink 165 to a fountain roller 161 which carries the ink 165 to a conventional anilox roller 115. For example, FIG. 11 illustrates the inking system 450 of FIG. 8 mounted within a conventional ink pan 160 so that it can be easily installed in a flexographic printing system 100. The ink pan 160 in this example is similar to that disclosed in commonly-assigned U.S. Pat. No. 9,327,494 to G. Smith et al., entitled "Flexographic printing system with pivoting ink pan," which is incorporated herein by reference. However, it will be obvious that the present invention could be adapted to be mounted within any type of conventional ink pan 160. In the illustrated configuration, the inking system 450 is held in place by a shaft 478 which is inserted into the holes where the fountain roller 161 (FIG. 3) is normally mounted.

Figure 12:
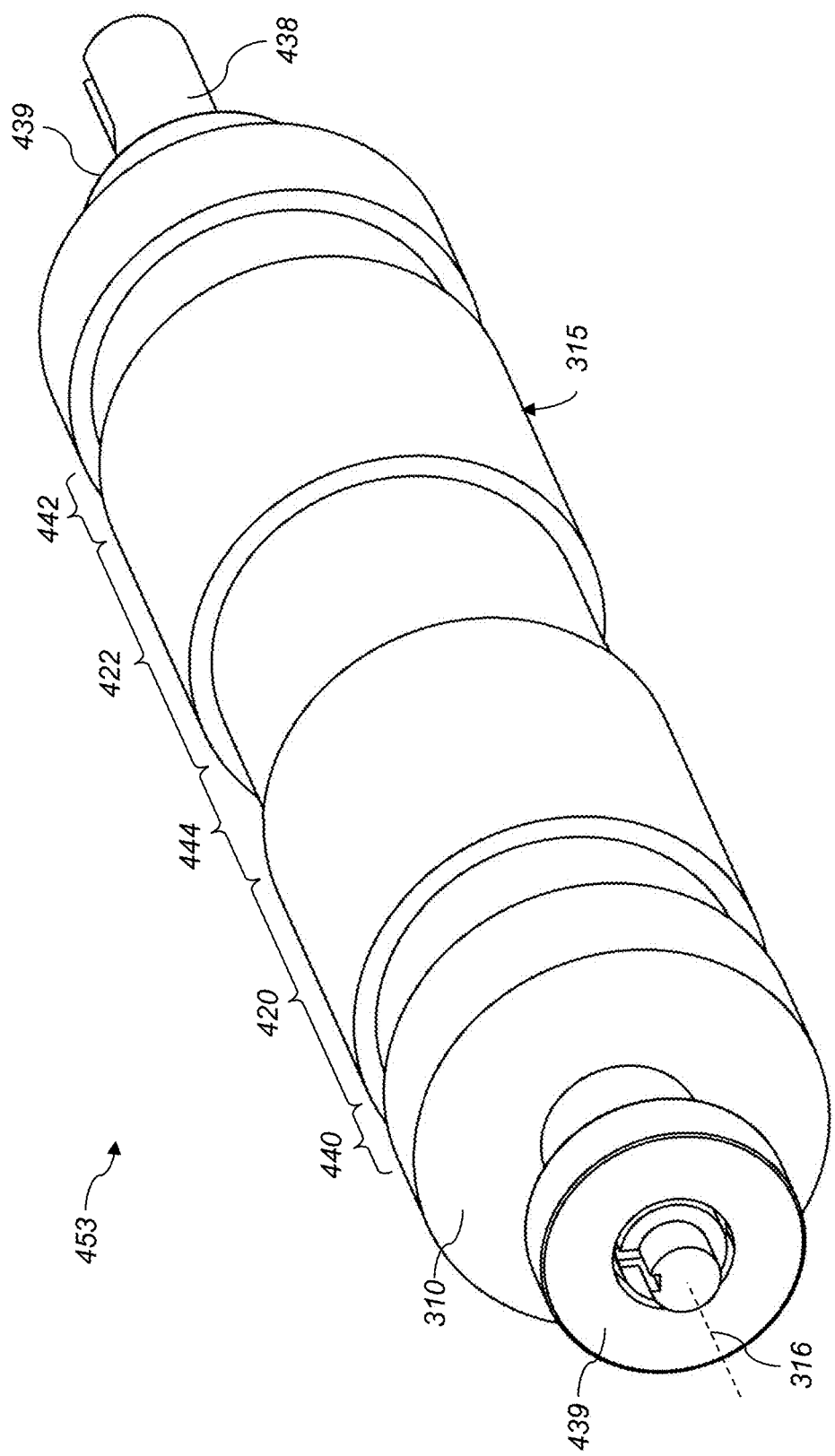
FIG. 12 illustrates an anilox roller including a plurality of ink transfer zones in accordance with an alternate embodiment.

In some embodiments, an anilox roller 452 including a plurality of ink transfer zones 420, 422 can be used as illustrated in FIG. 12. The adjacent ink transfer zones 420, 422 are separated by an intervening bearing contact zones 444, in addition to the bearing contact zones 440, 442 which are outside of the outermost ink transfer zones 420, 422. In some configurations, a single ink tray assembly 454 (FIG. 7) can be repositioned to engage with a selected one of the ink transfer zones 420, 422. In other configurations, one or more additional ink tray assemblies 454 are provided and positioned to simultaneously supply ink to a plurality of the ink transfer zones 420, 422.

The present invention has been described with respect to an improved inking system 450 including an anilox roller 452. Some flexographic printing systems 100 use anilox members that take the form of anilox sleeves rather than anilox rollers, where the anilox sleeves fit over cylindrical cores for mounting in the flexographic printing system 100. It will be obvious to one skilled in the art that the same principles can be used to provide an improved anilox member where a sleeve is used to provide the outer surface of the anilox roller 452, in at least the ink transfer zone 420.

Figure 13:
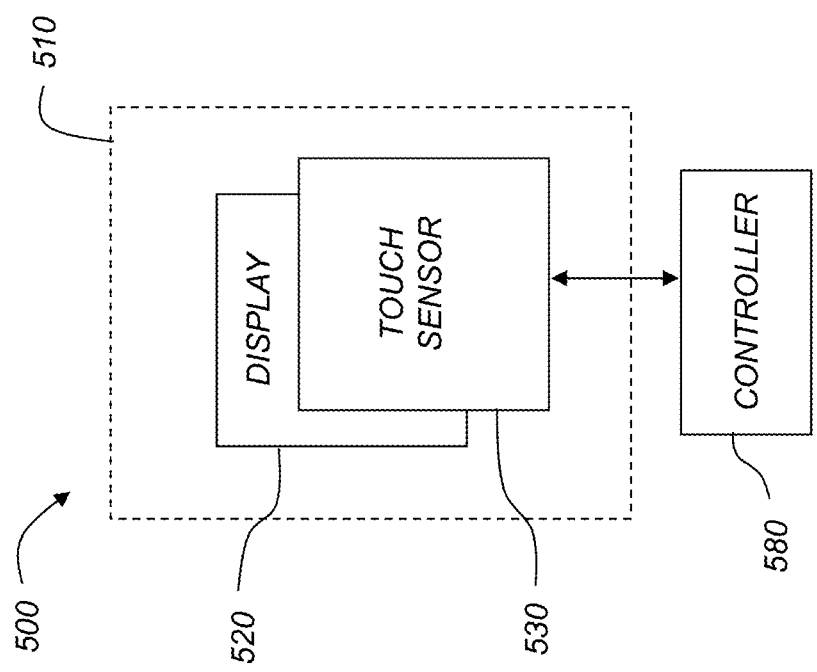
FIG. 13 is a high-level system diagram for an apparatus having a touch screen with a touch sensor that can be printed using embodiments of the invention.

Embodiments of the present invention can be used in the fabrication of various types of printed electrical devices including touch screen devices and RF antennas. FIG. 13 shows a high-level system diagram for an exemplary apparatus 500 (i.e., an electrical device) having a touch screen 510 including a display device 520 and a touch sensor 530 that overlays at least a portion of a viewable area of display device 520. Touch sensor 530 senses touch and conveys electrical signals (related to capacitance values for example) corresponding to the sensed touch to a controller 580. Touch sensor 530 is an example of an article that can be printed on one or both sides by the flexographic printing system 100 in accordance with the method of the present invention and plated using an embodiment of roll-to-roll liquid processing system 200.

Figure 14:
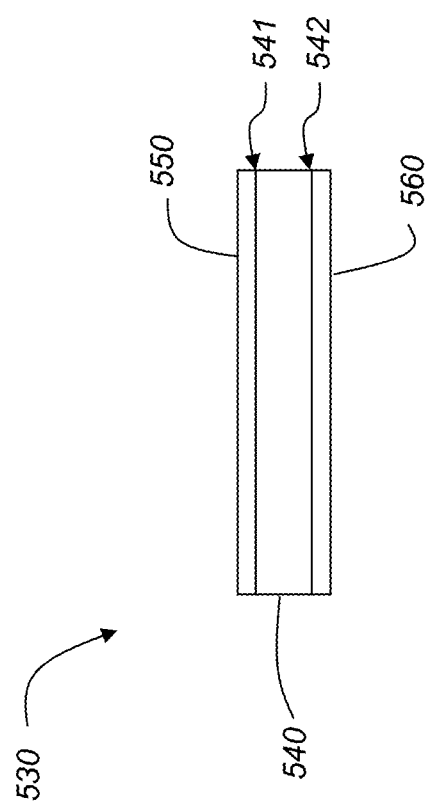
FIG. 14 is a side view of the touch sensor of FIG. 13.

FIG. 14 shows a schematic side view of a touch sensor 530. Transparent substrate 540, for example polyethylene terephthalate, has a first conductive pattern 550 printed and plated on a first side 541, and a second conductive pattern 560 printed and plated on a second side 542. The length and width of the transparent substrate 540, which is cut from the take-up roll 104 (FIG. 1), is not larger than the flexographic printing plates 112, 122, 132, 142 of flexographic printing system 100 (FIG. 1), but it could be smaller than the flexographic printing plates 112, 122, 132, 142.

Figure 15:
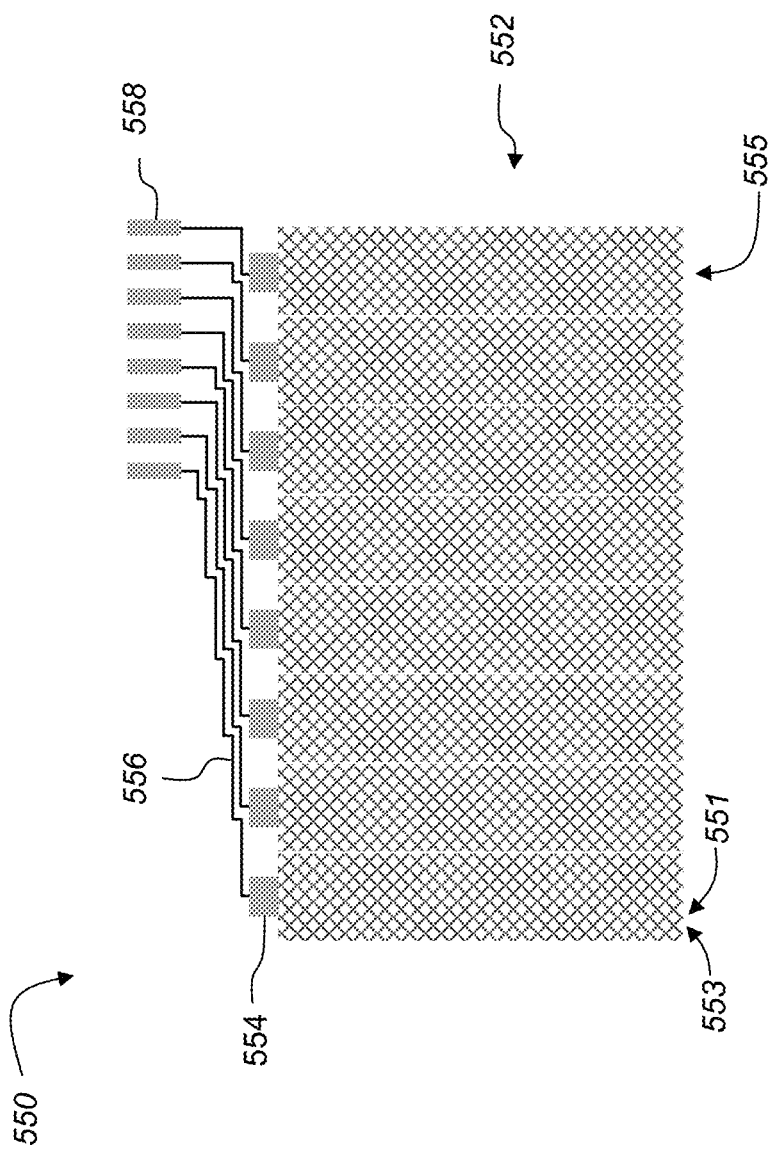
FIG. 15 is a top view of a conductive pattern printed on a first side of the touch sensor of FIG. 14.

FIG. 15 shows an example of a conductive pattern 550 that can be printed on first side 541 (FIG. 14) of transparent substrate 540 (FIG. 14) using one or more print modules such as print modules 120 and 140 of flexographic printing system (FIG. 1), followed by plating using a roll-to-roll electroless plating system 200 (FIG. 2). Conductive pattern 550 includes a grid 552 including grid columns 555 of intersecting fine lines 551 and 553 that are connected to an array of channel pads 554. Bus lines 556 connect the channel pads 554 to connector pads 558 that are connected to controller 580 (FIG. 13). Conductive pattern 550 can be printed by a single print module 120 in some embodiments. However, because the optimal print conditions for fine lines 551 and 553 (e.g., having line widths on the order of 4 to 8 microns) are typically different than for printing the wider channel pads 554, connector pads 558 and bus lines 556, it can be advantageous to use one print module 120 for printing the fine lines 551 and 553 and a second print module 140 for printing the wider features. Furthermore, for clean intersections of fine lines 551 and 553, it can be further advantageous to print and cure one set of fine lines 551 using one print module 120, and to print and cure the second set of fine lines 553 using a second print module 140, and to print the wider features using a third print module (not shown in FIG. 1) configured similarly to print modules 120 and 140.

Figure 16:
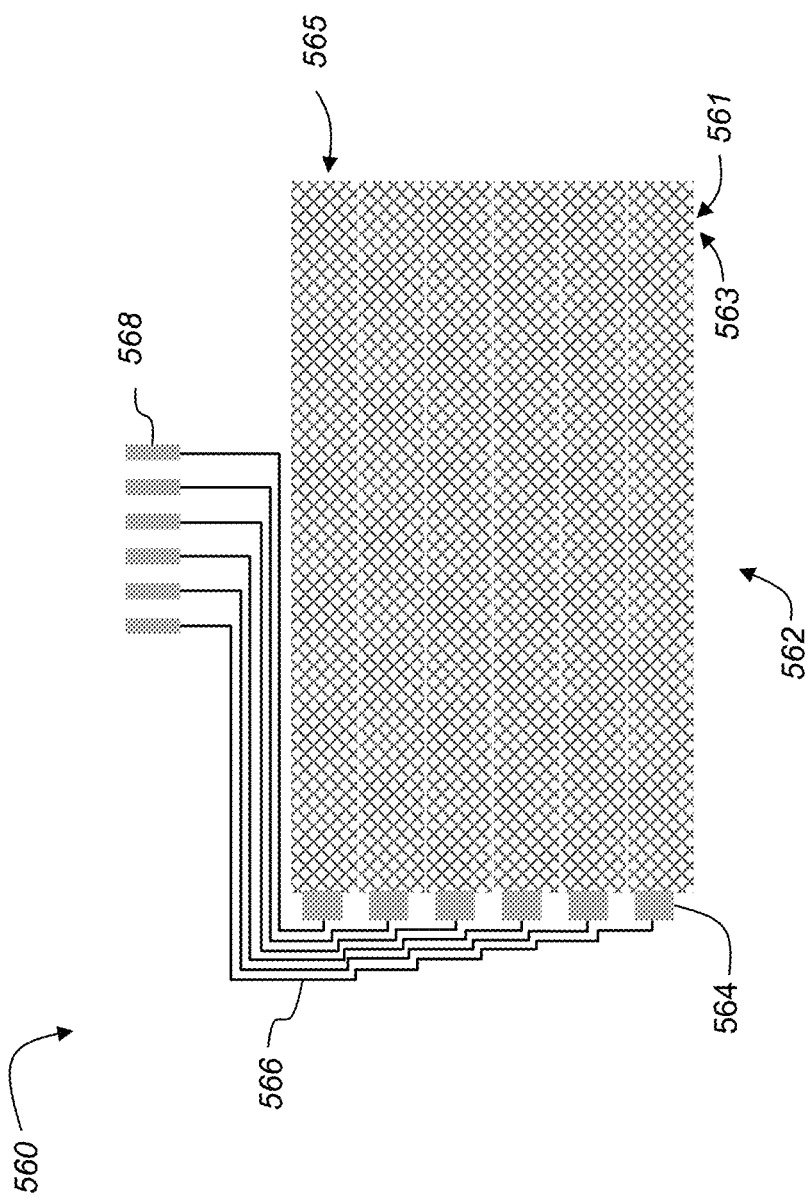
FIG. 16 is a top view of a conductive pattern printed on a second side of the touch sensor of FIG. 14.

FIG. 16 shows an example of a conductive pattern 560 that can be printed on second side 542 (FIG. 14) of substrate 540 (FIG. 14) using one or more print modules such as print modules 110 and 130 of flexographic printing system (FIG. 1), followed by plating using a roll-to-roll electroless plating system 200 (FIG. 2). Conductive pattern 560 includes a grid 562 including grid rows 565 of intersecting fine lines 561 and 563 that are connected to an array of channel pads 564. Bus lines 566 connect the channel pads 564 to the connector pads 568 that are connected to controller 580 (FIG. 13). In some embodiments, conductive pattern 560 can be printed by a single print module 110. However, because the optimal print conditions for fine lines 561 and 563 (e.g., having typical line widths on the order of 4 to 8 microns) are typically different than for the wider channel pads 564, connector pads 568 and bus lines 566, it can be advantageous to use one print module 110 for printing the fine lines 561 and 563 and a second print module 130 for printing the wider features. Furthermore, for clean intersections of fine lines 561 and 563, it can be further advantageous to print and cure one set of fine lines 561 using one print module 110, and to print and cure the second set of fine lines 563 using a second print module 130, and to print the wider features using a third print module (not shown in FIG. 1) configured similarly to print modules 110 and 130.

Alternatively, in some embodiments conductive pattern 550 can be printed using one or more print modules configured like print modules 110 and 130, and conductive pattern 560 can be printed using one or more print modules configured like print modules 120 and 140 of FIG. 1 followed by plating using a roll-to-roll electroless plating system 200 (FIG. 2) to simultaneously plate the patterns on both sides of the transparent substrate 540 (FIG. 14).

In the illustrated conductive patterns 550, 560 of FIGS. 15-16, the channel pads 554, 564 are shown to be along one edge of the respective grid columns 555 and grid rows 565. In other configurations, some of the channel pads 554 can be positioned along one end of the grid columns 555 and some of the channel pads 554 can be positioned along the opposite end of the grid columns 555. Likewise, some of the channel pads 564 can be positioned along one end of the grid rows 565 and some of the channel pads 564 can be positioned along the opposite end of the grid rows 565. In such cases, the bus lines 556, 566 can be routed around the perimeter of the conductive patterns 550, 560 to connect with the respective connecter pads 558, 568.

With reference to FIGS. 13-16, in operation of touch screen 510, controller 580 can sequentially electrically drive grid columns 555 via connector pads 558 and can sequentially sense electrical signals on grid rows 565 via connector pads 568. In other embodiments, the driving and sensing roles of the grid columns 555 and the grid rows 565 can be reversed.

Figure 17:
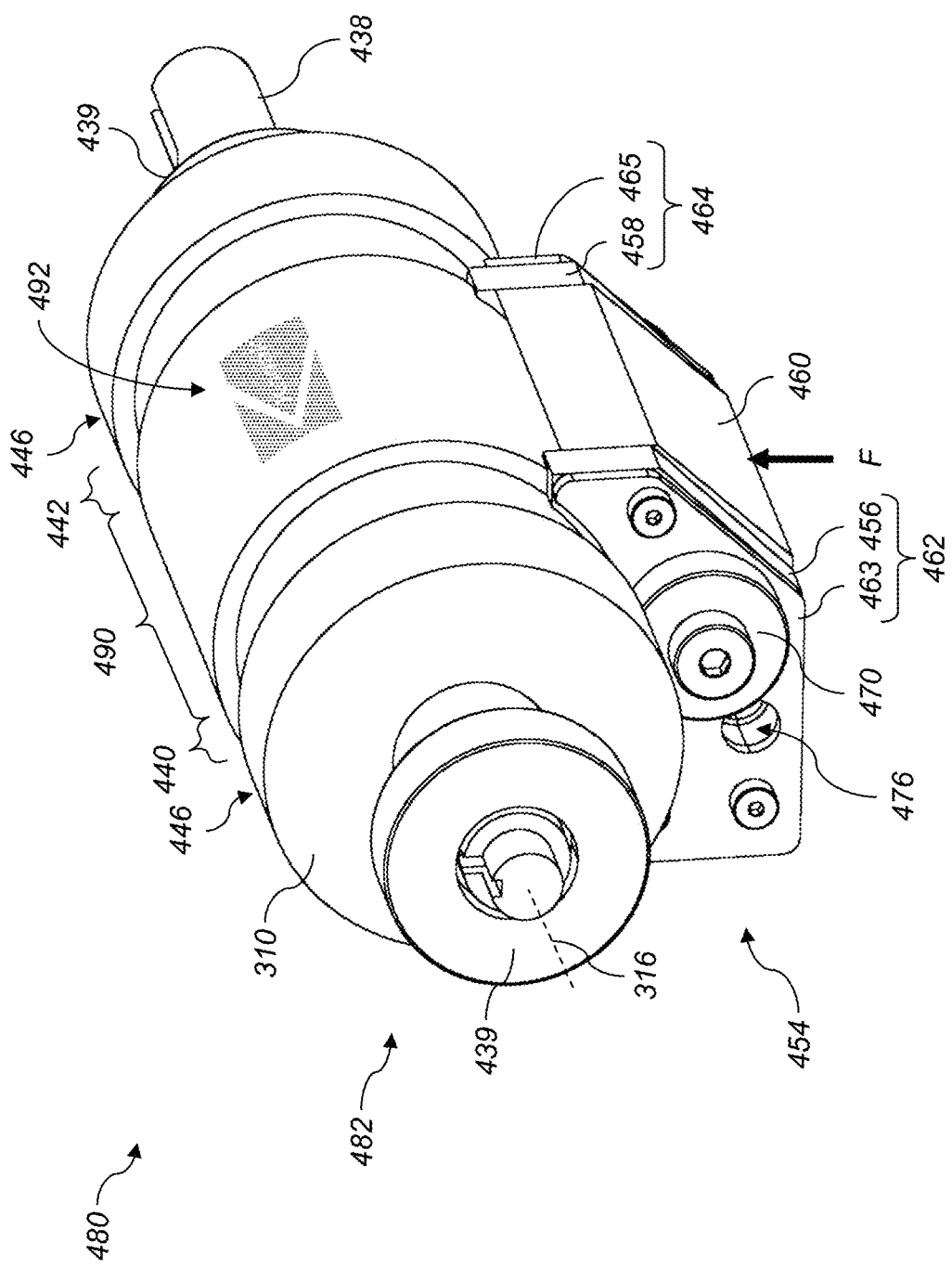
FIG. 17 illustrates an improved inking system for a gravure printing system in accordance with an exemplary embodiment.

The embodiments described above have been with respect to inking systems 450 for inking anilox rollers 452 in flexographic printing applications. It will be obvious to one skilled in the art that the same principles can be applied for inking systems in other types of printing applications, particularly where low volumes of ink are required. For example, FIG. 17 shows an alternate embodiment of an inking system 480 for a gravure printing application, which is analogous to the inking system 450 of FIG. 8. In this embodiment, the anilox roller 452 is replaced by a gravure cylinder 482. The gravure cylinder 482 includes a printing zone 490, surrounded on either side by bearing contact zones 440, 442 having a reduced radius relative to the printing zone. The printing zone 490 includes a printing surface 492 which is etched with cells of varying size in accordance with the image pattern to be printed. The printing surface 492 is typically the outer surface of the gravure cylinder 482. However, in some cases it can be a gravure printing plate which is affixed to the surface of the gravure cylinder 482. The cells of the printing surface 492 transfer ink from the ink tray 460 to the receiver medium (not shown). The remaining features of the gravure inking system 480 are analogous to those discussed above relative to the anilox roller inking system 450.

The invention has been described in detail with particular reference to certain preferred embodiments thereof, but it will be understood that variations and modifications can be effected within the spirit and scope of the invention.

PARTS LIST 100 flexographic printing system
102 supply roll
104 take-up roll 105 process direction
106 roller
107 roller
110 print module
111 plate cylinder
112 flexographic printing plate
113 raised features
114 impression cylinder
115 anilox roller
116 UV curing station
117 imaging system
120 print module
121 plate cylinder
122 flexographic printing plate
124 impression cylinder
125 anilox roller
126 UV curing station
130 print module
131 plate cylinder
132 flexographic printing plate
134 impression cylinder
135 anilox roller
136 UV curing station
140 print module
141 plate cylinder
142 flexographic printing plate
144 impression cylinder
145 anilox roller
146 UV curing station
150 substrate
151 first side
152 second side
160 ink pan
161 fountain roller
162 front wall
163 rear wall
164 floor
165 ink
166 pivot axis
167 lip
168 lowest portion
180 doctor blade
181 contact point
182 contact point
183 contact point
184 contact point
200 electroless plating system
202 supply roll
204 take-up roll
205 in-track direction
206 drive roller
207 drive roller
208 web-guiding roller
210 plating solution
215 replenished plating solution
220 reservoir
230 tank
232 drain pipe
234 return pipe
236 filter
240 pump
242 controller
250 web of media
251 first surface
252 second surface
310 cylinder
311 end
312 end
313 edge
314 edge
315 outer surface
316 roller axis
320 roller mount
330 surface coating
335 thickness
340 cell
345 cell size
350 wall
355 thickness
360 close-up view
370 cross-sectional view
380 anilox roller pattern
415 anilox roller
420 ink transfer zone
422 ink transfer zone
430 non-contact zone
435 non-contact zone
438 shaft
439 bearing
440 bearing contact zone
442 bearing contact zone
444 bearing contact zone
446 non-recessed zone
450 inking system
452 anilox roller
454 ink tray assembly
456 end seal
458 end seal
460 ink tray
461 floor
462 end wall
463 plate
464 end wall
465 plate
466 upper edge
468 upper edge
470 bearing
472 bearing
474 bolt
476 mounting hole
478 shaft
480 inking system
482 gravure cylinder
490 printing zone
492 printing surface
500 apparatus
510 touch screen
520 display device
530 touch sensor
540 transparent substrate
541 first side
542 second side
550 conductive pattern
551 fine lines
552 grid
553 fine lines
554 channel pads
555 grid column
556 bus lines
558 connector pads
560 conductive pattern
561 fine lines
562 grid
563 fine lines 564 channel pads
565 grid row
566 bus lines
568 connector pads
580 controller
F force
G gap
S spacing

The invention claimed is:

1. An inking system for use in transferring ink to a flexographic printing plate in a flexographic printing system, comprising:
   an anilox member having a cylindrical outer surface, the outer surface including:
      a first recessed bearing contact zone;
      a second recessed bearing contact zone; and
      an ink transfer zone located between the first and second recessed bearing contact zones, the ink transfer zone having a plurality of cells, the cells being indentations in the outer surface of the anilox member configured to transfer ink to the flexographic printing plate;
      wherein a radius of the outer surface in the first and second recessed bearing contact zones is less than a radius of the outer surface in the ink transfer zone; and
   an ink tray assembly, including:
      an ink tray having a floor and first and second end walls; and
      first and second bearings mounted to the first and second end walls of the ink tray on the outside surface of the first and second end walls of the ink tray, respectively;
      wherein the first and second bearings engage with the first and second recessed bearing contact zones, respectively, thereby positioning the ink tray assembly in a specified position relative to the anilox member;
      wherein upper edges of the first and second end walls extend into the first and second recessed bearing contact zones of the anilox member, respectively.

2. The inking system of claim 1, wherein the first and second end walls include rigid end wall plates, and wherein the first and second bearings extend above upper edges of the end wall plates.

3. The inking system of claim 1, wherein the first and second end walls include rigid end wall plates, and wherein upper edges of the end wall plates include a curved portion having an end wall radius of curvature.

4. The inking system of claim 3, wherein the end wall radius of curvature is greater than the radius of the outer surface of the anilox member in the first and second recessed bearing contact zones.

5. The inking system of claim 1, wherein the floor of the ink tray has a curved portion having a tray radius of curvature.

6. The inking system of claim 5, wherein the tray radius of curvature is greater than the radius of the outer surface of the anilox member in the ink transfer zone.

7. The inking system of claim 5, wherein a minimum gap between the floor of the ink tray and the outer surface of the anilox member in the ink transfer zone is at least 0.005 inches.

8. The inking system of claim 1, wherein the first and second end walls include end seals made of a compressible material, wherein the end seals seal against the outer surface of the anilox member in the ink transfer zone.

9. The inking system of claim 1, further including a force mechanism that pushes the ink tray assembly against the anilox member with a specified force.

10. The inking system of claim 1, wherein the inking system is adapted to be mounted within a conventional ink tray, replacing a conventional anilox roller and fountain roller.

11. The inking system of claim 1, wherein the anilox member includes one or more additional ink transfer zones separated by additional recessed bearing contact zones.

12. The inking system of claim 11, wherein the ink tray assembly is adapted to be repositioned to supply ink to a selected one of the ink transfer zones.

13. The inking system of claim 11, wherein the ink tray assembly is positioned to supply ink to one of the ink transfer zones, and further including an additional tray assembly positioned to supply ink to another of the ink transfer zones.

14. The inking system of claim 1, wherein the radius of the outer surface in the first and second recessed bearing contact zones is less than the radius of the outer surface in the ink transfer zone by at least 0.050 inches.

15. The inking system of claim 1, wherein the first and second recessed bearing contact zones are at opposite ends of the anilox member.

16. The inking system of claim 1, wherein said anilox member is adapted to rotate around a roller axis and said first and second bearings are adapted to rotate around a bearing axis which is separate from said roller axis.

17. The inking system of claim 16, wherein said roller axis is substantially parallel to said bearing axis.

18. The inking system of claim 1, wherein an outer surface of the first bearing engages with an outer surface of the first recessed bearing contact zone and an outer surface of the second bearing engages with an outer surface of the second recessed bearing contact zone.

* * * * *